United States Patent [19]
Holmes, Jr.

[11] 3,768,143
[45] Oct. 30, 1973

[54] METHOD AND APPARATUS FOR STRIPPING ELECTRICAL CABLE ENDS

[76] Inventor: Robert Holmes, Jr., 15 South Rd., Wayne, N.J. 07470

[22] Filed: July 26, 1971

[21] Appl. No.: 165,504

[52] U.S. Cl. ................................... 29/427, 81/9.51
[51] Int. Cl. ............................................. B23p 19/02
[58] Field of Search ...................... 29/421, 426, 427; 81/9.51; 83/924

[56] References Cited
UNITED STATES PATENTS
3,621,560   11/1971   LeBright ............................. 29/427
2,165,013   1/1965    Oehlerking ......................... 81/9.51

Primary Examiner—Charles W. Lanham
Assistant Examiner—James R. Duzan
Attorney—C. Cornell Remsen, Jr. et al.

[57] ABSTRACT

To strip the filler materials from the end of electrical cable insulations in a manner capable of using high-speed production processes, the cable is suitably held adjacent the end to be stripped. The filler materials are subjected to treatment with water, steam, moist air or high pressure dry air. The limp and loose filler material is blown back over the cable by means of air pressure or steam, and the limp filler strips are suitably sheared. A production apparatus for implementing this method is also disclosed. The method and apparatus are also designed for use on appliance power cords.

8 Claims, 18 Drawing Figures

PATENTED OCT 30 1973 3,768,143

INVENTOR.
ROBERT HOLMES, JR.
BY
*Marvin Chaben*

METHOD AND APPARATUS FOR STRIPPING ELECTRICAL CABLE ENDS

BACKGROUND OF THE INVENTION

In dressing the end of an electrical cable prior to connection to a connector or terminal, the jute, paper, rayon, nylon or similar filler strips used to provide insulating layers must be removed neatly. At present, in most cases the cable is rotated to loosen the spirally twisted filler materials and the materials are manually cut by a cutting pliers or other suitable hand tool.

This generally accepted method is cheap and may be accomplished without the need for machinery or apparatus of any kind (other than the hand tools previously mentioned). On this basis, the method is quite satisfactory for occasional cable dressings or feed repair. However, when a number of cables must be stripped for attachment to mass produced electrical appliances and terminal boards, the manual method is too slow, time-consuming and expensive.

SUMMARY OF THE INVENTION

The present invention provides a production process and a machine for implementing the removal of twisted strand or strip filler insulation from electrical cables simply and efficiently. In the machine, the cable is clamped peripherally to form a ring outwardly of which the cable is to be stripped. The free end of the cable insulation is subjected to a bath or jet flow of steam or moist air to loosen the filler and remove stiffening additives and inherent stiffness of the material. The loosened material ends are blown back over the clamping ring and can be severed by means of a suitable knife edge.

It is therefore an object of the invention to provide a new process for efficient removal of cable insulation from a cable end to be stripped and dressed.

It is a further object of the invention to provide a process capable of production techniques for removing insulation from a cable.

It is a still further object of the invention to provide a machine for implementing the process of removing cable insulation.

It is a still further object to provide a machine which holds a cable, causes the insulation to be loosened and maintained in a position readily severing the insulation.

DETAILED DESCRIPTION

Figure 1:
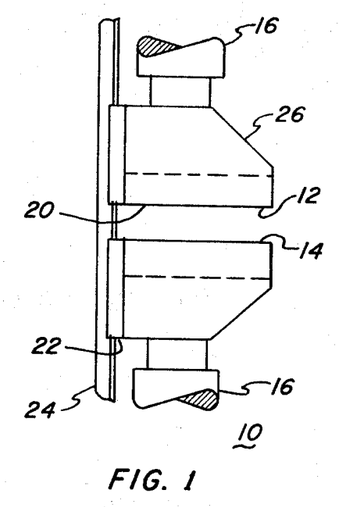
FIG. 1 is a side view in elevation of a pair of cable clamping jaws according to my invention (shown in a slightly open condition)
Figure 2:
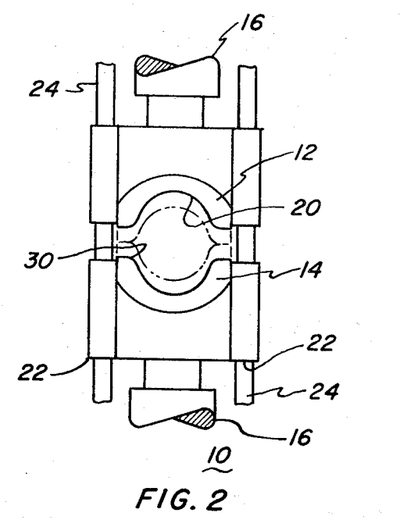
FIG. 2 is a front view taken in elevation of the jaws of FIG. 1.

In the drawings of FIGS. 1–6, I show an exemplary form of one embodiment of each of the components used to form one embodiment of my machine for effecting the method shown in FIGS. 8–17. In FIGS. 1 and 2, I show cable clamp 10 which comprises two mating jaw sections 12 and 14, either or both of which are adapted to be reciprocated to hold therebetween a cable for the stripping process which is to follow.

The jaws may be moved together by pneumatic means, hydraulic means or the like acting through opposed rams 16. The jaws have a cylindrical cavity 20 which is designed to hold therein a cable to be stripped when the jaws are closed to the position shown in dashed lines in FIG. 2.

The jaws have at the rear on both sides guide slots 22 for retaining therein stationary guide rails 24 to maintain the jaws against lateral movement and displacement. The jaws are reciprocated by the rams 16 and are constrained to vertical motion by the guide rails riding within the guide slots.

The jaws, as seen best in FIG. 1, have their front faces tapered as indicated by the reference numeral 26 to provide a comparatively smaller front face.

Further, as can be seen in FIG. 2, the corners of the jaws are rounded as indicated by chamfer 30 to remove possible cable pinching edges.

Figure 3:
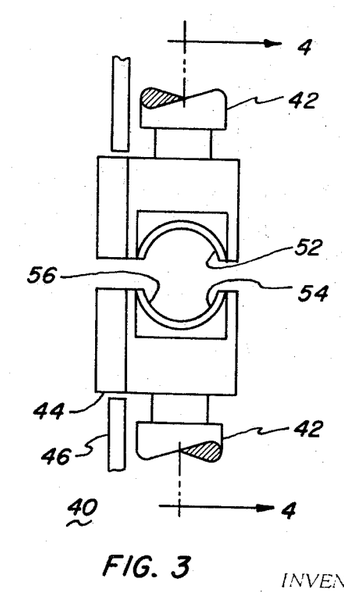
FIG. 3 is a front view in elevation of a sheath stripping die according to my invention.
Figure 4:
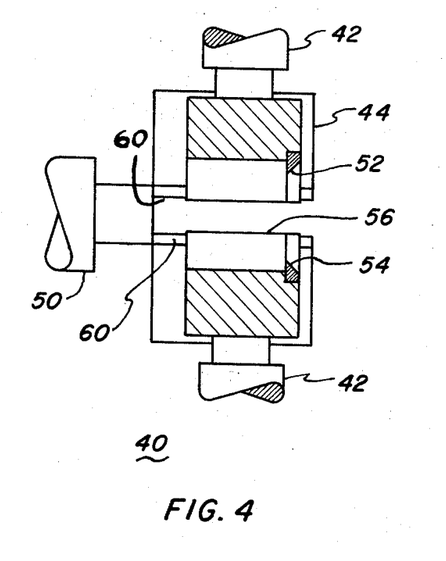
FIG. 4 is a sectional view taken along line 4—4' of FIG. 3.

Aligned coaxially with the cable clamps 10 are the sheath stripping dies 40 shown best in FIGS. 3 and 4. These dies are mounted for reciprocatory motion in a plane parallel to the plane of movement of the jaws of cable clamp 30 through the action of ram cylinders 42. The dies 40 are constrained to this motion by slide guides 44 and stationary rails 46 which retain the lateral alignment similar to the movement of the clamp jaws, as previously described. In addition, the stripping dies are capable of movement in a forward to rear sense under the control of cylinder 50, although not shown as such in the figures. Thus, the sheath stripping dies actually move in opposed rectangular patterns. With the dies in the retracted and open position, they are advanced by horizontal acting cylinder 50 laterally abreast of and outwardly of the cable clamp. They are then closed onto the cable by vertical movement of cylinders 42. Arcuate knife edges 52 and 54 form the active faces of the dies and on closure of the dies, these edges 52 and 54 enter the sheath and sever the sheath by shearing action. Naturally, the center opening 56 formed by the closed knife edges is sized to prevent damage to the conductors and their insulation within a cable, the edges only cutting into and through the sheath.

Under the control of the horizontal acting cylinder 50 the dies with their knife edges retract along rails 60 to fully retracted position with the dies spaced axially from the cable jaws. These movements are shown schematically in FIGS. 10 and 11.

Figure 5:
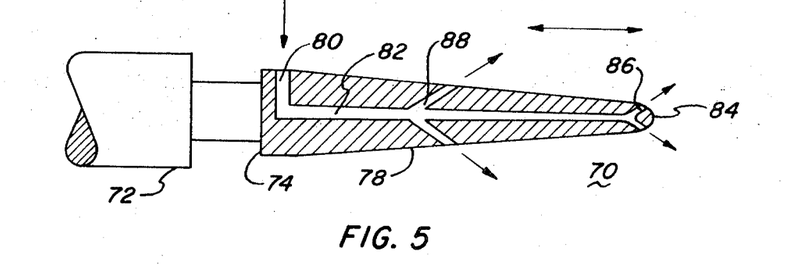
FIG. 5 is a sectional view through the center of a fluid introducing cone according to my invention.

In FIG. 5, I show a core separating cone 70 which is aligned or alignable with the central axis of cable clamp 10 and capable of being advanced toward the cable clamp 10 and which is stopped a suitable distance from the cable clamps by suitable means, not shown.

The cone 70 may advance through the open dies 40, or the dies may be suitably pivoted and moved out of the work area, at the conclusion of the phase of the cycle in which they are operative.

The cone 70 has a reciprocatory drive rod 72 connected to the base 74 of the cone to advance and retract the cone axially. The cone itself may be hollow if desired or may be fabricated of any suitable material such as plastic in the form of a cone whose axial length is considerably greater than the diameter of its base 74. Along the sidewall 78 adjacent to the base 74, a radial fluid passage 80 is formed in the cone. This passage communicates with an axial passage 82 leading to the cone tip 84. Branching off the axial passage 82 are opposed inclined passages 86 adjacent to the cone tip and auxiliary passages 88. Passages 86 and 88 are open through the conic sidewall, such that when a fluid such as compressed air or steam is introduced into passage 80, the fluid is ejected from the cone tip or nose passages 86 and auxiliary passages 88.

Figure 6:
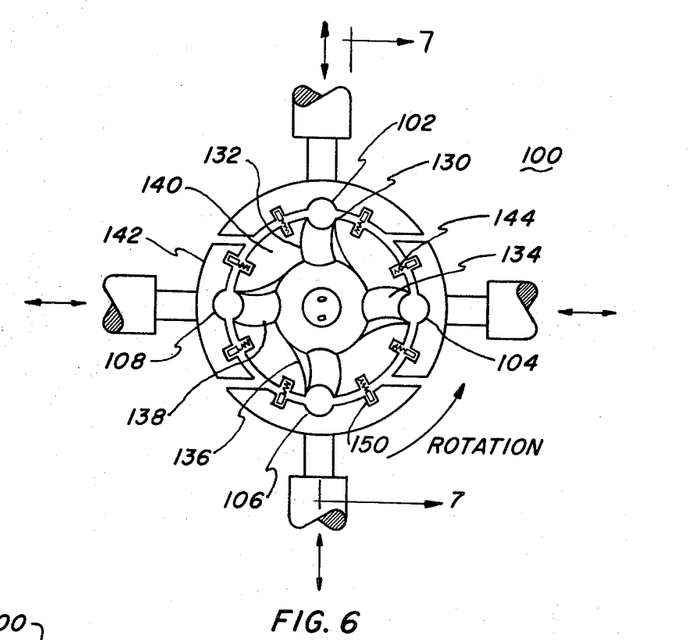
FIG. 6 is an end view into the opening of a conductor insulation stripping device according to my invention.
Figure 7:
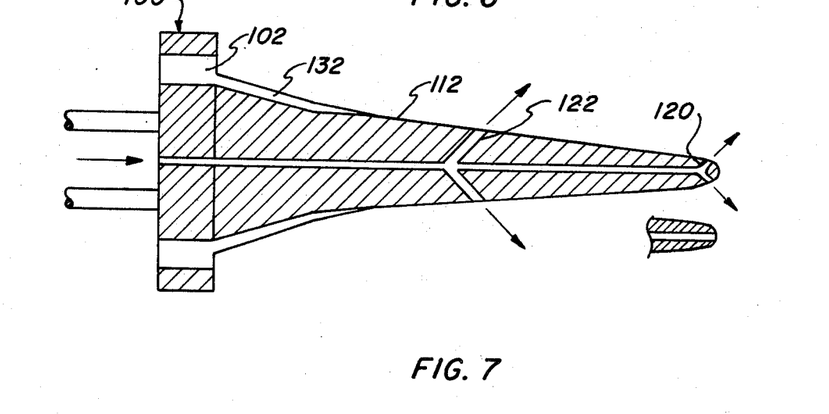
FIG. 7 is a sectional view of an alternate construction form including the device of FIG. 6 incorporated into a unit with a revised form of cone as shown in FIG. 5 taken along line 7—7 of FIG. 6.

In FIG. 6, I show an individual conductor insulation stripping device 100. In FIG. 7, I combine this device 100 with a cone similar to cone 70 of FIG. 5 to combine a number of steps in my method. This device comprises four individual strippers 102, 104, 106 and 108 angularly spaced adjacent the base of and parallel to the axis of a cone 112. The cone 112 is similar in configuration to cone 70 in that it may be hollow but will include an axial fluid inlet path in its base, the path extending the axial length of the cone and terminating in opposed hose jet outlets 120 and auxiliary outlets 122 midway along the axial dimension of the core, both the nose jets and auxiliary outlets being directed angularly outwardly away from the cone base.

Adjacent to the base of the cone is a cutting ring 130 including the four axially spaced strippers, each of which comprises an annular opening. Along the sidewall of the cone toward the ring 130, are provided helical guide paths 132, 134, 136 and 138, each leading to a respective one of the strippers. The guide paths comprise arcuate depressions in the cone sidewall, such that when the cone is advanced toward a cable in the manner of FIG. 17, the guide paths will direct the specific conductor wires toward ring 130.

The ring 130 includes as mentioned previously four conductor openings, these openings being formed by complementary semi-circular cutouts in inner and outer cutter segments 140 and 142. Inner segment 140 is stationary and outer segment 142 is normally biased away from segment 140 under the influence of individual compression springs 144, each resting within a spring recess 150. Each segment comprises one fourth of the ring 130 and each encompasses one of the conductor stripping dies.

Each outer segment is, as mentioned previously, normally biased outwardly away from the inner segments a limited distance. Each of the outer segments has an individual air cylinder 160 for advancing the segment into engagement with the inner segment acting against the bias of springs 144, the springs acting to restore the outer segments to their normal position on release of the advance force acting on the air cylinders.

The segments surrounding each of the conductor openings comprise cutting die members for deeply scoring the insulation on conductors resting within the individual conductor opening. Retraction of the cone cylinder will retract the ring 130 and will strip the scored insulation from the conductors toward and past the free ends of the conductors.

Figure 8:
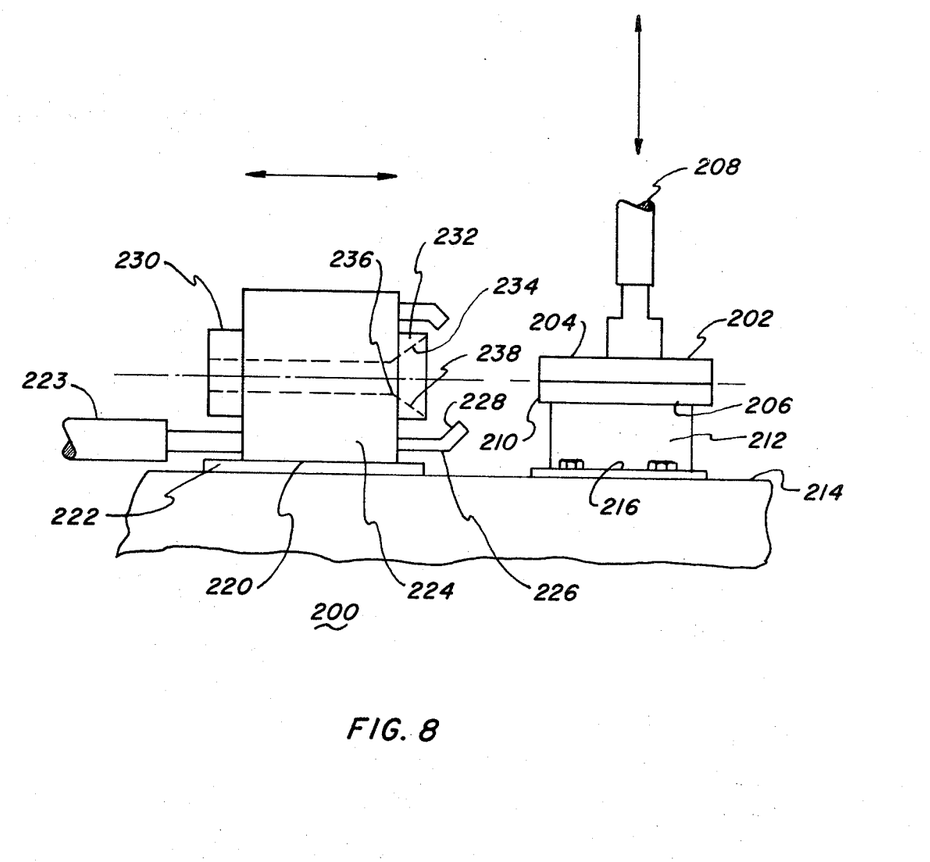
FIG. 8 is a schematic side view of an alternate device usable in place of the components shown in FIGS. 5–7.

In FIG. 8, I show an alternate cable filler stripping device 200 which includes a cable clamp 202 which comprises a split tube having an upper half tube 204 and a lower half tube 206. A cylinder 208, pneumatic, hydraulic or electrically actuated, is advanced radially toward the clamp tube to clamp the tube over a cable and retracted to release the cable. The mouth 210 of the tube may be suitably chamfered or beveled annularly.

The clamp is mounted stationarily within a rigid mount 212 and fastened to a work surface 214 on a mounting base 216.

Positioned adjacent to the clamp tube mouth is a sliding carriage 220 which may ride within a T slot 222 or the like incised in surface 214 under the control of a driving cylinder 223. The carriage includes a mounting base 224 holding two or more spaced apart fluid conduits 226 for compressed air or steam. These conduits are aligned parallel to the surface 214 and to the bore of clamp tube 202 and each terminates in a nozzle 228 directed inwardly at an angle toward the mouth of the clamp tube.

These jets are positioned radially outwardly of the clamp tube and as mentioned are inclined toward the mouth of the clamp tube.

Axially aligned with the clamp tube is a cutter member 230. This member comprises a tube 232 with an annularly flared opening 234 adjacent the clamp tube. At its inner end 236, the inner diameter of opening 234 is smaller than the outer diameter of the flare mouth 238, greater than the outside diameter of the clamp tube. Thus, when the carriage is advanced into engagement with the clamp tube, the tube mouth will pass into the annular flare. The annular passage normally has a small clearance (e.g. about 0.005 inch), however the tube may contact the wall intermediately along its surface. Suitable steps may be provided to limit the travel of the carriage as necessary.

Figure 9:
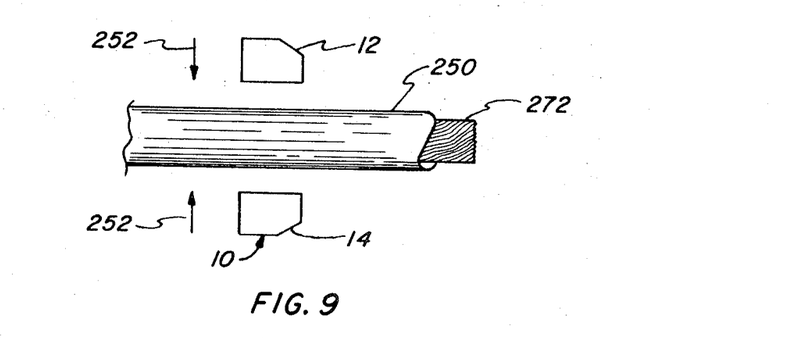
FIGS. 9–12 show schematically successive steps in applying further alternate apparatus in place of the apparatus of FIGS. 1–4 in using the method disclosed and claimed herein.
Figure 10:
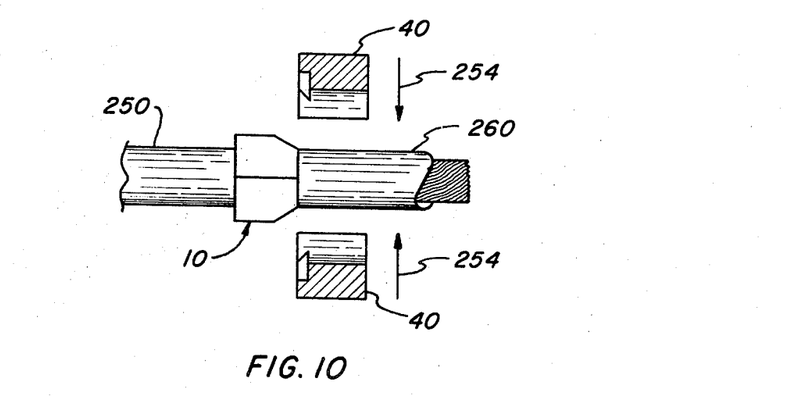
Figure 11:
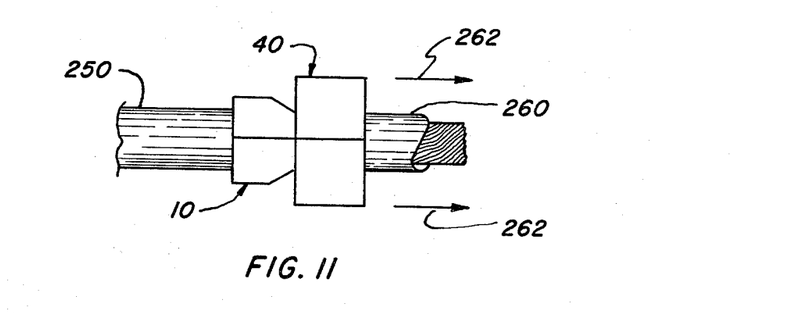

As to the utilization of the components of FIGS. 1–7, the following method is set forth as shown in sequence in FIGS. 9–18. In FIG. 9, there can be seen the sheathed cable 250 which is fed between the spaced apart open jaws 12 and 14 of the cable clamp 10. By suitable means, the cable feed is stopped when approximately eight inches of cable protrude beyond the clamp. The jaws close in the direction indicated by direction arrow 252 to the position of FIG. 10. In FIG. 10, the jaws of clamp 10 are shown fitted tightly about cable 250 to hold the cable in place.

In FIG. 10, the sheath stripping dies 40 are shown in the retracted position. The dies are advanced in the directions indicated by direction arrows 254 to the position of FIG. 11. As the dies approach the position of FIG. 11 they shear the outer protective sheath 260 of cable 550 about its periphery. The sheath stripping dies are then retracted parallel to the cable axis in the direction of arrows 262 thereby removing the sheared cable sheath from the free end of the cable.

Figure 12:
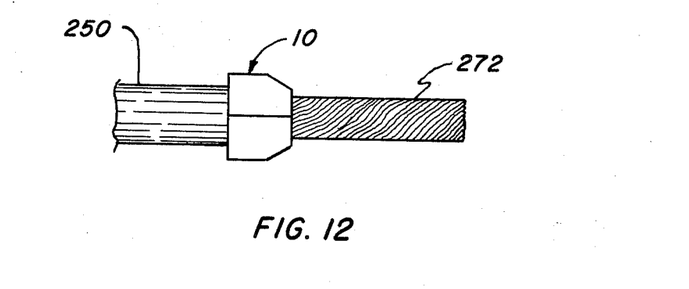

In FIG. 12, I show the cable 250 stripped of its sheath in the section to the right of the cable clamps which continue to grip the cable. The stripped end 264 of the cable now has a plurality of insulated conductors 270 (shown in FIG. 13) within a protective insulating layer 272. The insulating layer 272 usually comprises an overlay of successive strands 274 (shown in FIG. 13) of fibrous material such as strings, strips or strands of paper of jute wound in a helix or spiral pattern to the face end.

Figure 13:
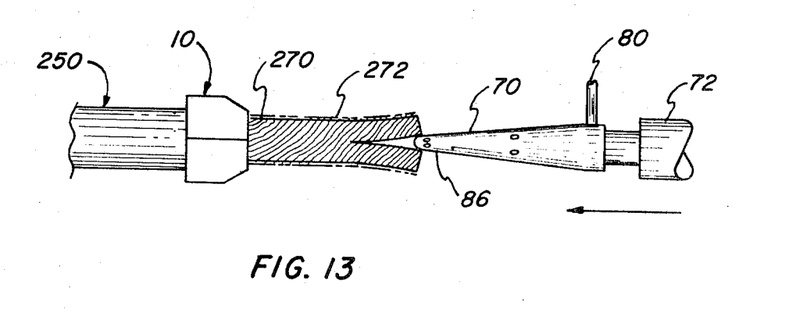
FIGS. 13–18 show schematically successive steps embodying the process, alternative to the apparatus of FIG. 8.

In FIG. 13, I show the separating cone 70 advancing into the stripped end of the cable between the ends of insulated conductors 270. The cone is advanced along the centerline of the cable and pressurized fluid such as air or steam is expelled through jets 86 in the cone tip to loosen the filler strips and make them loose and limp as shown in FIG. 14.

The filler strips 274 comprise a layer about the insulated conductors and when loosened and made limp they hang from their connection to the portion of the filler strips beneath and around the remaining sheath. When the filler has been subjected to the stream of fluid from cone 70 for a predetermined time period found to sufficiently loosen and make limp the filler strands, the strands may readily be cut automatically. A beveled split tube cutter 275 (similar to cutter 230 in FIG. 8) is positioned outwardly and laterally from the cable clamps as shown in FIG. 14 to effect this cutting.

Figure 14:
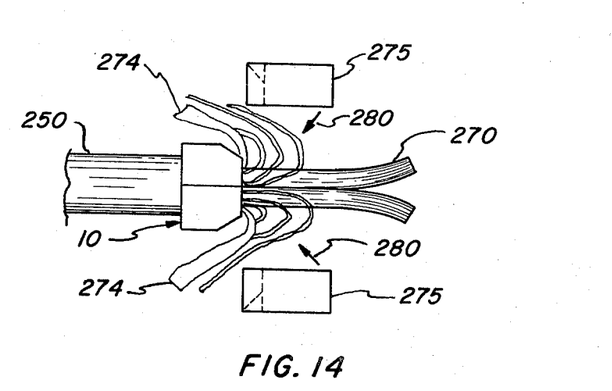

The tube cutter 275 is advanced inwardly and toward the clamp 10 in the direction indicated by diagonal arrows 280 of FIG. 14.

Figure 15:
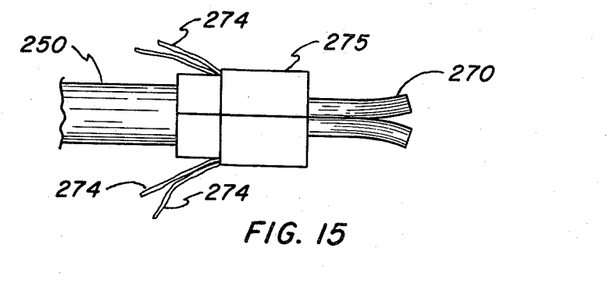

The jets of fluid will force the limp and loosened strands of filler material back against the clamp jaws and the tube cutter 275 will sever these strands between the tube cutter and the cable jaws in the manner shown in FIG. 15. The flared opening of the cutter cooperates with the clamp jaws to effect this cutting action.

Figure 16:
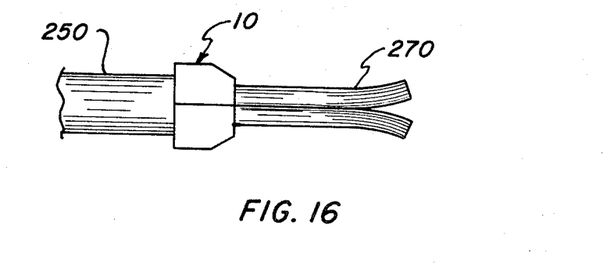

The cutter 272 is then retracted and the split halves separated to provide to the left of the clamps a clean section including the insulated conductors devoid of the protective fillers as seen in FIG. 16.

Figure 17:
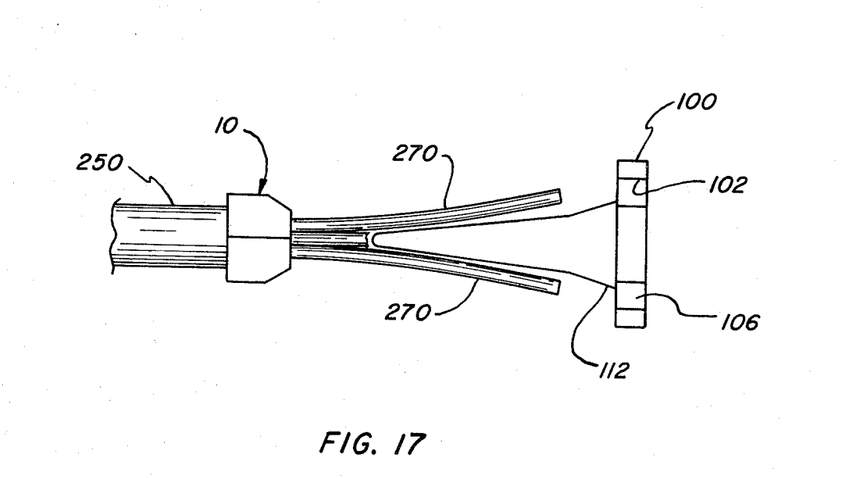
Figure 18:
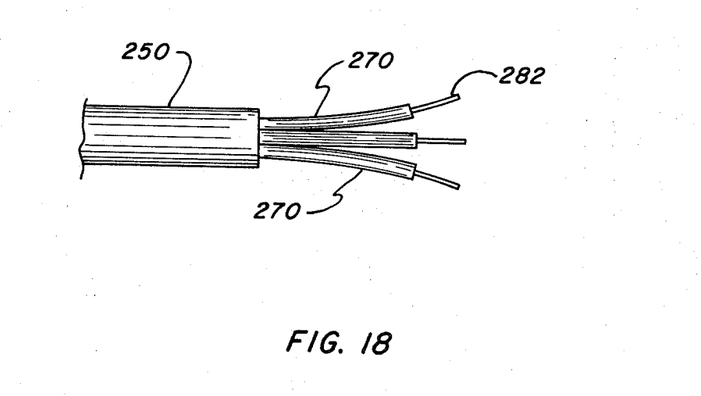

In FIG. 17, I show the conductor insulator stripping device 100 (of FIGS. 6 and 7) partially entered into the open end of the installed conductors of FIG. 16. In this figure, I have combined the cone of FIG. 5 with a stripping device 100 to effect the step shown in FIG. 13 to strip insulation from the specific conductors.

Using the cone 100, the cone enters the group of wires either before or after removal of the filler material. When using the combined form of device shown in FIG. 16, the cone remains between the conductors during the filler removal steps in much the position of FIG. 17. The cone does not impede the movement of the cutter 272 while it severs the filler material.

After retraction of the cutter 275, the cone 112 further enters the grouping of conductors and its guide paths 132, 134, 136 and 138 to channel the insulated conductors into the respective strippers 102, 104, 106 and 108. The cone movement is stopped by suitable means when the conductors extend through the strippers a suitable distance. Thereafter the outer segments 142 of the strippers are actuated to shear the insulation from the conductors following which the stripping device is retracted, drawing the severed insulation from the conductors leaving a plurality of bare conductors with their insulation stripped uniformly a short distance from their free ends 282 and the cable sheath and filler removed cleanly a further distance along the cable, in the manner shown in FIG. 18.

The device 200 shown in FIG. 8 may be used to perform the functions shown in FIGS. 13-16 in one continuing step.

First the upper half tube 204 is retracted and a cable such as 250 (not shown in FIG. 8) is guided to rest in lower half tube 106 with an extent of cable protruding past the tube mouth. Cylinder 208 is actuated to close the upper tube on the lower tube and clamp a cable between the tube halves. Naturally, the cable diameter and the tube diameter are selected to ensure this clamping action.

Steam is fed through conduits 226 and emitted through nozzles 228 to the end of a cable in the tube 204-206. The carriage 220 is advanced slowly toward the cable by the drive cylinder 223. As the carriage advances, the filler material having been subjected to the steam under pressure loosens and lies limply about the cable. As the carriage continues to advance and the jets continue to subject the filler strands to steam under pressure, the filler strands are forced back about the tube 204-206 as the carriage advance continues.

The carriage continues to advance until the flare mouth 234 of cutter 230 engages the clamp tube mouth 210 shearing the filler strands. The steam input is terminated slightly before this engagement by suitable means during the carriage advance. The engagement of the clamp tube mouth 210 with the flared mouth of the cutter severs the filler strands which have by this time been loosened and blown back over the tube mouth. The carriage is then retracted. Jets 226 may again be actuated temporarily to blow and clear away the severed strands.

I claim:

1. The method of stripping and cleaning sheathed cable comprising the steps of clamping the cable adjacent the area to be stripped, circumferentially seering the cable sheath at an incision and stripping the severed sheath beyond the free end of the cable, directing a flow of fluid at the end of the cable in direction toward the incision to loosen all filler strands and to force said strands back over the incision, severing said filler strands adjacent said incision, guiding individual conductor wires within said cable into individual conductor insulator severing members, severing the insulation on said conductors, and stripping the free ends of said conductors by withdrawing said conductors from said insulation severing members.

2. The method of claim 1, wherein said filler strand loosening step is effected by physically separating the conductors within said cable from one another while directing said flow of fluid toward the filler strands to loosen and make limp the filler strands.

3. A device for stripping one end of a sheathed cable comprising: means for clamping said cable adjacent the area to be stripped, severing means movable to a position at the demarcation of the sheath to be stripped, cutting members on said severing means for incising said cable sheath circumferentially, means for directing a flow of fluid toward the stripped cable end, wherein said flow directing means include a separating member introduceable into said cable to physically separate the conductors thereof to further loosen filler strands surrounding said conductors, means for severing said fillers adjacent said sheath incision and wherein said conductor separating means comprises a conic member movable axially relative to said cable, guide paths on the sidewall of said conic member for the conductors of said cable, a stripping ring outward of the base of said conic member for receiving individual conductors, and individually controlled conductor insulation severing members in said ring receptive of said conductors for severing the insulation thereon.

4. A device for stripping a cable having a plurality of insulated conductors with a layer of stranded fiber filler commonly disposed about said insulated conductors, said device comprising a first member for holding said cable adjacent one end thereof, a conic member with the axis of said conic member substantially aligned with the axis of said one end of said cable and the apex of said member directed toward said one cable end, means producing relative axially directed movement of said members toward one another to separate the insulated conductors of said cable, fluid flow jets in said conic member directed toward the filler layer for spreading the filler layer, and means for circumferentially severing the fibers of the filler layers.

5. A device as claimed in claim 4, wherein said cable initially has a sheath about said filler layer, and in which said device includes means for initially severing a length of said sheath to produce a circumferential sheath edge thereby to expose said length of filler layer, wherein said jets are positioned to force the strands of said filler outwardly and back over said sheath edge, and said layer severing means cooperates with said sheath edge to sever said filler layer.

6. The device of claim 4, further including means adjacent the base of said conic member for receiving individual insulated conductors for removal of the insulation therefrom.

7. The method of automatically stripping and cleaning sheathed cable having a plurality of separately insulated conductors with a layer of stranded filler between said insulated conductors and said sheath, the process comprising the steps of grasping the cable a distance from one end thereof to position a length of cable to be stripped, circumferentially severing the cable sheath at the edge of said length to be stripped, and removing the sheath therefrom, directing a jet of fluid toward said one end inwardly of said layer to loosen filler strands and to impel the loosened filler strands folded back over the edge of said sheath, introducing a member generally along the axis of the cable from said one end to separate the separately insulated conductors from one another, and thereafter severing the strands of said layer.

8. A method as claimed in claim 7, in which the layer is composed of fibrous strands and the fluid of said flow comprises a liquid for rendering said strands limp during said loosening of the layer, and in which the strands of said layer are severed by shearing the fibers of said layer against the sheath edge.

* * * * *